United States Patent
Muhammad et al.

(10) Patent No.: US 12,356,353 B2
(45) Date of Patent: Jul. 8, 2025

(54) SYNCHRONIZATION OF TN DATA AND NTN DATA BASED ON COMMUNICATION DELAY

(71) Applicant: RAKUTEN MOBILE, INC., Tokyo (JP)

(72) Inventors: Awn Muhammad, Tokyo (JP); Pankaj Shete, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/998,499

(22) PCT Filed: Nov. 11, 2021

(86) PCT No.: PCT/JP2021/041641
§ 371 (c)(1),
(2) Date: Nov. 11, 2022

(87) PCT Pub. No.: WO2023/032234
PCT Pub. Date: Mar. 9, 2023

(65) Prior Publication Data
US 2024/0267861 A1  Aug. 8, 2024

(30) Foreign Application Priority Data
Aug. 31, 2021  (JP) ................................. 2021-141330

(51) Int. Cl.
*H04W 56/00* (2009.01)
*H04W 84/06* (2009.01)

(52) U.S. Cl.
CPC ... *H04W 56/0045* (2013.01); *H04W 56/0095* (2013.01); *H04W 84/06* (2013.01)

(58) Field of Classification Search
CPC ......... H04W 56/0045; H04W 56/0095; H04W 84/06; H04W 56/0025; H04W 56/006; H04B 7/18517; H04B 17/318; H04B 17/345; G01S 19/24
See application file for complete search history.

(56) References Cited

U.S. PATENT DOCUMENTS

| | | | |
|---|---|---|---|
| 2021/0036769 A1* | 2/2021 | Sorond | H04B 7/2615 |
| 2021/0297923 A1* | 9/2021 | Wei | H04W 84/005 |
| 2023/0319661 A1* | 10/2023 | Maattanen | H04W 36/0085 370/331 |

FOREIGN PATENT DOCUMENTS

| | | | |
|---|---|---|---|
| JP | 2010278886 A | 12/2010 | |
| JP | 6704438 B2 | 6/2020 | |

OTHER PUBLICATIONS

Extended European Search Report in EP Application No. 21956113.1 dated Dec. 9, 2024, 12pp.

* cited by examiner

*Primary Examiner* — Ashley Shivers
(74) *Attorney, Agent, or Firm* — HAUPTMAN HAM, LLP

(57) ABSTRACT

A communication control apparatus that controls a terrestrial network including a terrestrial base station installed on the ground and capable of communicating with a communication device by means of time-continuous TN data, and, a non-terrestrial network including a flying base station and capable of communicating with a communication device by means of time-continuous NTN data, includes: a signal strength reduction unit that reduces signal strength of at least part of at least one of the TN data and the NTN data at least in an overlapping area of the terrestrial communication cell and the flying communication cell; a communication delay acquisition unit that acquires communication delay between the flying base station and the flying communication cell; and a synchronization unit that synchronizes the TN data and the NTN data based on the communication delay acquired by the communication delay acquisition unit.

13 Claims, 12 Drawing Sheets

FIG.6

| IE/Group Name | Presence | Range | IE type and reference | Semantics description |
|---|---|---|---|---|
| >FDD | | | | |
| >>ABS Pattern Info | M | | BIT STRING (SIZE(40)) | Each position in the bitmap represents a DL subframe, for which value "1" indicates 'ABS' and value "0" indicates 'non ABS'. The first position of the ABS pattern corresponds to subframe 0 in a radio frame where SFN = 0. The ABS pattern is continuously repeated in all radio frames. The maximum number of subframes is 40. |
| >ABS Inactive | M | | NULL | Indicates that interference coordination by means of almost blank sub frames is not active |

SYNCHRONIZATION OF TN DATA AND NTN DATA BASED ON COMMUNICATION DELAY

RELATED APPLICATIONS

The present application is a National Phase of International Application No. PCT/JP2021/041641, filed Nov. 11, 2021, and claims priority based on Japanese Patent Application No. 2021-141330, filed Aug. 31, 2021.

BACKGROUND OF THE INVENTION

1. Field of the Invention

The present disclosure relates to communication control technology in communication system.

2. Description of the Related Art

The number, types, and applications of wireless communication devices, represented by smartphones and Internet of Things (IoT) devices, continue to increase, and wireless communication standards continue to be expanded and improved. For example, the commercial service of the fifth generation mobile communication system known as "5G" started in 2018, and the standards are still being developed by the 3GPP (Third Generation Partnership Project). Efforts are also underway to develop standards for "6G" or the sixth generation mobile communication system, which would be the next generation of wireless communication standards following 5G.

Mobile communication networks for mobile or portable communication devices such as smartphones and cell phones (hereinafter collectively referred to as "communication device(s)") are usually constructed by communication cells (hereinafter referred to as "terrestrial communication cell(s)") provided by base stations installed on the ground (hereinafter referred to as "terrestrial base station(s)"). However, in some areas, it was difficult to install a sufficient number of terrestrial base stations for various reasons, resulting in a relatively low quality of mobile communications.

In order to solve the issue of the disparity in mobile communication quality among different regions and the so-called "out-of-range" issue, where mobile communication devices cannot communicate in some regions, non-terrestrial networks (NTN) have been considered. In NTN, communication satellites or unmanned aircrafts flying in outer space or the atmosphere, such as the stratosphere, are used as base stations (hereinafter referred to as flying base station(s), and especially communication satellites are referred to as satellite base station(s)). The flying base station provides a communication cell on the ground (hereinafter referred to as flying communication cell(s), and especially communication cells provided by communication satellites are referred to as satellite communication cell(s)). A communication device in a flying communication cell communicates with a flying base station directly or indirectly via other communication devices. By providing flying communication cells in areas where terrestrial communication cells are not sufficient, the quality of mobile communication in such areas can be improved.

Patent Literature 1: JP-A-2010-278886

SUMMARY OF THE INVENTION

Terrestrial communication cell and flying communication cell provided on the ground by terrestrial base station and flying base station may overlap each other. When such terrestrial communication cell and flying communication cell use overlapping or adjacent frequency bands, if terrestrial communication radio waves from a terrestrial base station and flying communication radio waves from a flying base station interfere with each other in the overlapping area of the communication cells, a communication device in the overlapping area may not be able to communicate with one or both of the terrestrial base station and the flying base station. In addition, flying base stations such as communication satellites and unmanned aircrafts cause significant communication delays or propagation delays because of the greater distance from communication device compared to terrestrial base stations installed on the ground. Thus, the interference and delay between the TN and the NTN must be considered in a communication system where a terrestrial network (TN) and a non-terrestrial network coexist.

The present disclosure was made in view of the circumstances, and its purpose is to provide a communication control apparatus and the like which consider interference and delay between TN and NTN.

In order to solve the above issue, a communication control apparatus in a certain aspect of the present disclosure that controls a terrestrial network including a terrestrial base station installed on the ground and capable of communicating with a communication device in a terrestrial communication cell provided by the terrestrial base station on the ground by means of time-continuous TN data, and, a non-terrestrial network including a flying base station and capable of communicating with a communication device in a flying communication cell provided by the flying base station on the ground by means of time-continuous NTN data, includes: a signal strength reduction unit that reduces signal strength of at least portion of at least one of the TN data and the NTN data at least in an overlapping area of the terrestrial communication cell and the flying communication cell; a communication delay acquisition unit that acquires communication delay between the flying base station and the flying communication cell; and a synchronization unit that synchronizes the TN data and the NTN data based on the communication delay acquired by the communication delay acquisition unit.

According to the aspect, the signal strength reduction unit reduces the signal strength of portion of the TN or the NTN data, so that the interference of TN communication radio wave and NTN communication radio wave in the overlapping area of the terrestrial communication cell and the flying communication cell can be reduced. In addition, the synchronization unit synchronizes the TN data and the NTN data based on the communication delay between the flying base station and the flying communication cell, so that the signal strength reduction unit can properly reduce the interference of TN communication radio wave and NTN communication radio wave at the right timing.

Another aspect of the present disclosure is a communication control method. The communication control method that controls a terrestrial network including a terrestrial base station installed on the ground and capable of communicating with a communication device in a terrestrial communication cell provided by the terrestrial base station on the ground by means of time-continuous TN data, and, a non-terrestrial network including a flying base station and capable of communicating with a communication device in a flying communication cell provided by the flying base station on the ground by means of time-continuous NTN data, includes: reducing signal strength of at least portion of at least one of the TN data and the NTN data at least in an overlapping area of the terrestrial communication cell and the flying communication cell; acquiring communication delay between the flying base station and the flying communication cell; and synchronizing the TN data and the NTN data based on the acquired communication delay.

In addition, any combination of the above components, and any conversion of the expression of the present disclosure among methods, devices, systems, recording media, computer programs, and the like, is also valid as a form of the present disclosure.

According to the present disclosure, a communication control apparatus and the like which consider interference and delay between TN and NTN can be provided.

BRIEF DESCRIPTION OF THE DRAWINGS

FIG. 6 shows an example of ABS-related information shared between the TN side and the NTN side.

DETAILED DESCRIPTION OF THE INVENTION

Figure 1:
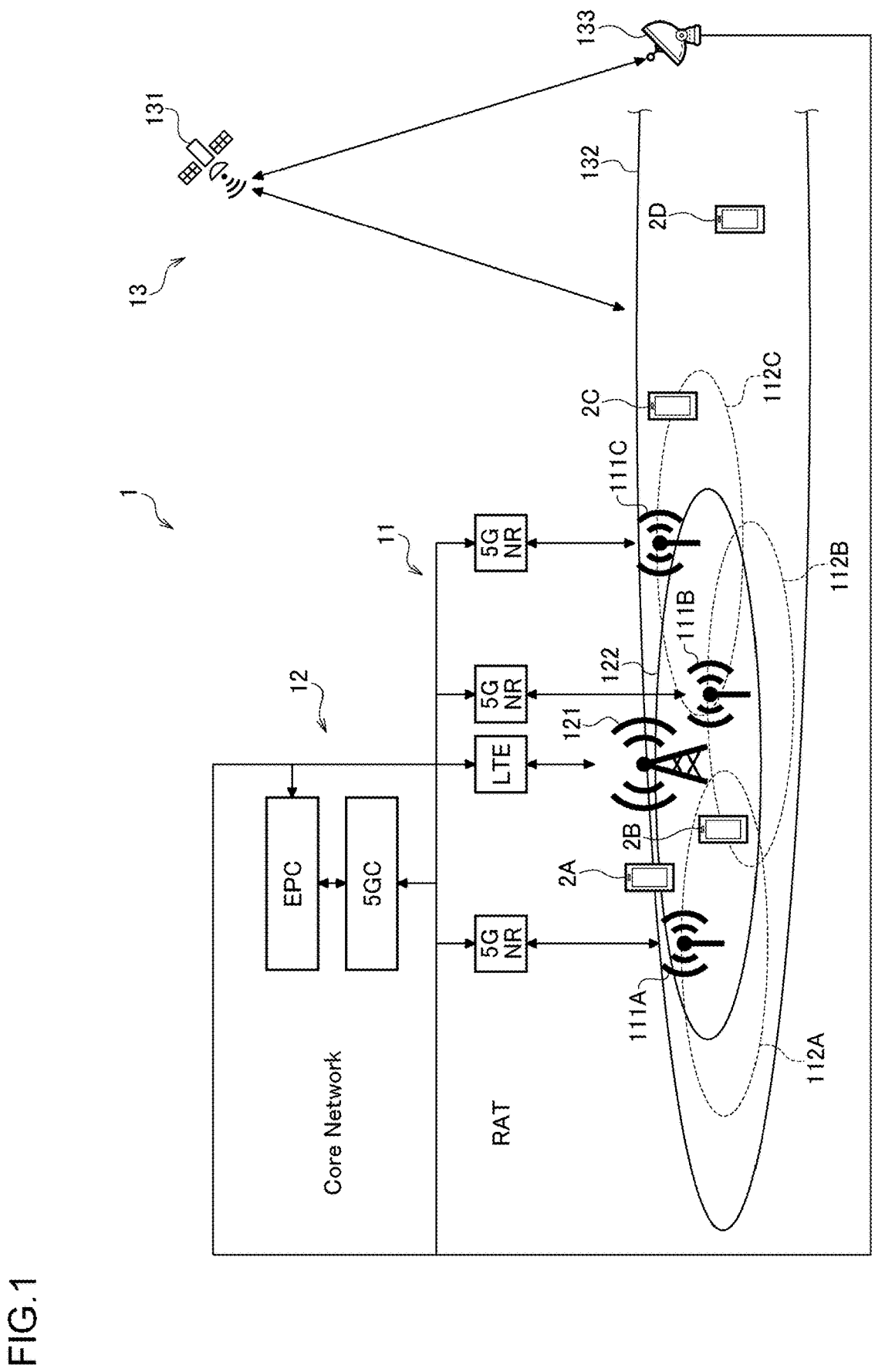
FIG. 1 schematically shows the overview of a wireless communication system to which the communication control apparatus is applied.

FIG. 1 schematically shows an overview of a wireless communication system 1 to which the communication control apparatus according to an embodiment of the present disclosure is applied. The wireless communication system 1 includes 5G wireless communication system 11, 4G wireless communication system 12, and satellite communication system 13. 5G wireless communication system 11 that complies with the fifth generation mobile communication system (5G) uses NR (New Radio) or 5G NR (Fifth Generation New Radio) as the radio access technology (RAT) and 5GC (Fifth Generation Core) as the core network. 4G wireless communication system 12 that complies with the fourth generation mobile communication system (4G) uses LTE (Long Term Evolution) or LTE-Advanced as the radio access technology and EPC (Evolved Packet Core) as the core network. Satellite communication system 13 is for satellite communication via communication satellite 131. Although not shown in the figure, the wireless communication system 1 may include wireless communication networks of a generation prior to 4G, a generation later than 5G (e.g. 6G), or any wireless communication networks that are not associated with generations, such as Wi-Fi (registered trademark).

The 5G wireless communication system 11 may include a plurality of 5G base stations 111A, 111B and 111C (hereinafter collectively referred to as 5G base station 111) installed on the ground capable of communicating by 5G NR with communicators or communication devices 2A, 2B, 2C and 2D (hereinafter collectively referred to as communication device(s) 2) such as smartphones, which are also referred to as UE (User Equipment). 5G base station 111 is also referred to as gNodeB (gNB). The coverage or support range of each 5G base station 111A, 111B and 111C is referred to as a cell 112A, 112B and 112C (hereinafter collectively referred to as 5G cell 112 or cell 112).

The size of the 5G cell 112 of each 5G base station 111 is arbitrary, but typically ranges from a few meters to several tens of kilometers in radius. Although there is no established definition, cells with a radius of a few meters to ten meters are called femtocells, cells with a radius of ten meters to several tens of meters are called picocells, cells with a radius of several tens of meters to several hundred meters are called microcells, and cells with a radius of more than several hundreds of meters are called macrocells. In 5G, high frequency radio waves such as millimeter waves are often used, and their high tendency to propagate in a straight-line causes radio waves to be blocked by obstacles, shortening the communication distance. For the reason, 5G tends to use more small cells than 4G and earlier generations.

The communication device 2 can conduct 5G communication when it is located within at least one of a plurality of 5G cells 112A, 112B and 112C. In the example shown in the figure, communication device 2B in 5G cells 112A and 112B can communicate with both 5G base stations 111A and 111B by 5G NR. In addition, the communication device 2C in the 5G cell 112C can communicate with the 5G base station 111C by 5G NR. Communication devices 2A and 2D are outside of all 5G cells 112A, 112B and 112C, so they are not able to communicate by 5G NR. The 5G NR-based 5G communication between each communication device 2 and each 5G base station 111 is managed by the 5GC, which is the core network. For example, the 5GC transfers data to and from each 5G base station 111, transfers data to and from external networks such as the EPC, the satellite communication system 13 and the Internet, and manages the movement of the communication device 2.

The 4G wireless communication system 12 includes a plurality of 4G base stations 121 (only one of them is shown in FIG. 1) installed on the ground that can communicate with the communication device 2 by LTE or LTE-Advanced. The base station 121 in 4G is referred to as eNodeB (eNB). Similar to each 5G base station 111, the communication range or support range of each 4G base station 121 is also called a cell and is shown as 122.

The communication device 2 can conduct 4G communication when it is located within 4G cell 122. In the example shown in the figure, the communication devices 2A and 2B in the 4G cell 122 can communicate with the 4G base station 121 by LTE or LTE-Advanced. Communication devices 2C and 2D are outside the 4G cell 122 and are not able to communicate by LTE or LTE-Advanced. The 4G communication by LTE and LTE-Advanced between each communication device 2 and each 4G base station 121 is managed by the EPC, which is the core network. For example, the EPC manages the transfer of data to and from each 4G base station 121, the transfer of data to and from external networks such as 5GC, the satellite communication system 13 and the Internet, and the movement management of the communication device 2.

If we take a look at each communication device 2A, 2B, 2C and 2D in the example shown in the figure, the communication device 2A is in a state that enables 4G communication with 4G base station 121, and communication device 2B is in a state that enables 5G communication with 5G base stations 111A and 111B and 4G communication with 4G base station 121, and communication device 2C is in a state that enables 5G communication with 5G base station 111C. When there are multiple base stations (111A, 111B and 121) as in the case of communication device 2B, one base station is selected as the most suitable for the communication device 2B in terms of communication quality and the like, under the control of the 5GC and/or the EPC, which is the core network. For the communication device 2D that is not in a state that enables 5G communication with any 5G base station 111 or 4G communication with any 4G base station 121, the communication is conducted using the satellite communication system 13 described below.

The satellite communication system 13 is the wireless communication system using communication satellites 131 as flying base stations. The communication satellites 131 are low-earth-orbit satellites flying in low-earth-orbit outer space of 500 to 700 km above the ground. Similar to 5G base station 111 and 4G base station 121, the communication range or support range of each communication satellite 131 is also called a cell and is shown as 132. Thus, a communication satellite 131 as a flying base station provides a satellite communication cell 132 as a flying communication cell onto the ground. Communication device 2 on the ground can conduct satellite communication when it is inside the satellite communication cell 132. Similar to 5G base station 111 in the 5G wireless communication system 11 and 4G base station 121 in the 4G wireless communication system 12, communication satellite 131 as the base station in the satellite communication system 13 is capable of wireless communication directly or indirectly via aircraft and the like with the communication device 2 within the satellite communication cell 132. The radio access technology used by the communication satellite 131 for wireless communication with the communication device 2 in the satellite communication cell 132 may be 5G NR, the same as the 5G base station 111, or LTE or LTE-Advanced, the same as the 4G base station 121, or any other radio access technology that the communication device 2 can use. Therefore, there is no need for the communication device 2 to have any special functions or components for satellite communication.

The satellite communication system 13 is equipped with a gateway 133 as a ground station that is installed on the ground and can communicate with the communication satellite 131. The gateway 133 is equipped with a satellite antenna to communicate with the communication satellite 131, and is connected to the 5G base station 111 and the 4G base station 121 as terrestrial base stations that constitute the terrestrial network (TN). In such a manner, the gateway 133 connects the non-terrestrial network (NTN), which includes communication satellites 131, and the terrestrial network TN, which includes terrestrial base stations 111 and 121, for mutual communication. When the communication satellite 131 conducts 5G communication with the communication device 2 in the satellite communication cell 132 by 5G NR, the 5GC connected via the gateway 133 and the 5G base station 111 in the TN (or the 5G radio access network) is used as the core network. When the communication satellite 131 conducts 4G communication with the communication device 2 in the satellite communication cell 132 by LTE or LTE-Advanced, the EPC connected via the gateway 133 and the 4G base station 121 in the TN (or the 4G radio access network) is used as the core network. In such a manner, appropriate coordination is made between different wireless communication systems such as 5G wireless communication system 11, 4G wireless communication system 12, satellite communication system 13 and the like through the gateway 133.

Satellite communication by communication satellites 131 is mainly used for covering areas with no or few terrestrial base stations such as 5G base stations 111 and 4G base stations 121 and the like. In the example shown in the figure, a communication device 2D that is outside the communication cells of all the terrestrial base stations communicates with the communication satellite 131. On the other hand, communication devices 2A, 2B and 2C that are in good communication with either of the terrestrial base stations, are also in the satellite communication cell 132 and can communicate with the communication satellite 131. However, by communicating with the terrestrial base stations instead of the communication satellite 131 as the satellite base station in principle, the limited communication resources (including power) of the communication satellite 131 are saved for the communication device 2D and the like. The communication satellite 131 uses beamforming to direct the communication radio wave to the communication device 2D in the satellite communication cell 132, thereby the communication quality with the communication device 2D is improved.

The size of the satellite communication cell 132 of the communication satellite 131 as a satellite base station depends on the number of beams emitted by the communication satellite 131. For example, a satellite communication cell 132 with a diameter of approximately 24 km can be formed by combining up to 2,800 beams. As illustrated, a satellite communication cell 132 is typically larger than a terrestrial communication cell such as a 5G cell 112 or a 4G cell 122, and could contain one or more 5G cells 112 and/or 4G cells 122 inside it. The above example shows a communication satellite 131 flying in low-earth-orbit outer space at a height of approximately 500 km to 700 km above the ground as a flying flying base station. However, a communication satellite flying in geostationary orbit or other higher orbit in outer space, or an unmanned or manned aircraft flying in stratosphere or other lower (e.g. approximately 20 km above the ground) atmosphere may be used as a flying base station in addition to or instead of the communication satellite 131.

As described above, the wireless communication system 1 in the embodiment contains: terrestrial network (TN) 11 and 12 that can communicate with communication devices 2 in the terrestrial communication cells 112 and 122 provided on the ground by the terrestrial base stations 111 and 121 installed on the ground; and non-terrestrial network (NTN) 13 that can communicate with communication devices 2 in the flying communication cell 132 provided on the ground by the flying base station 131. The communication control apparatus according to the embodiment controls the TN and the NTN.

Figure 2:
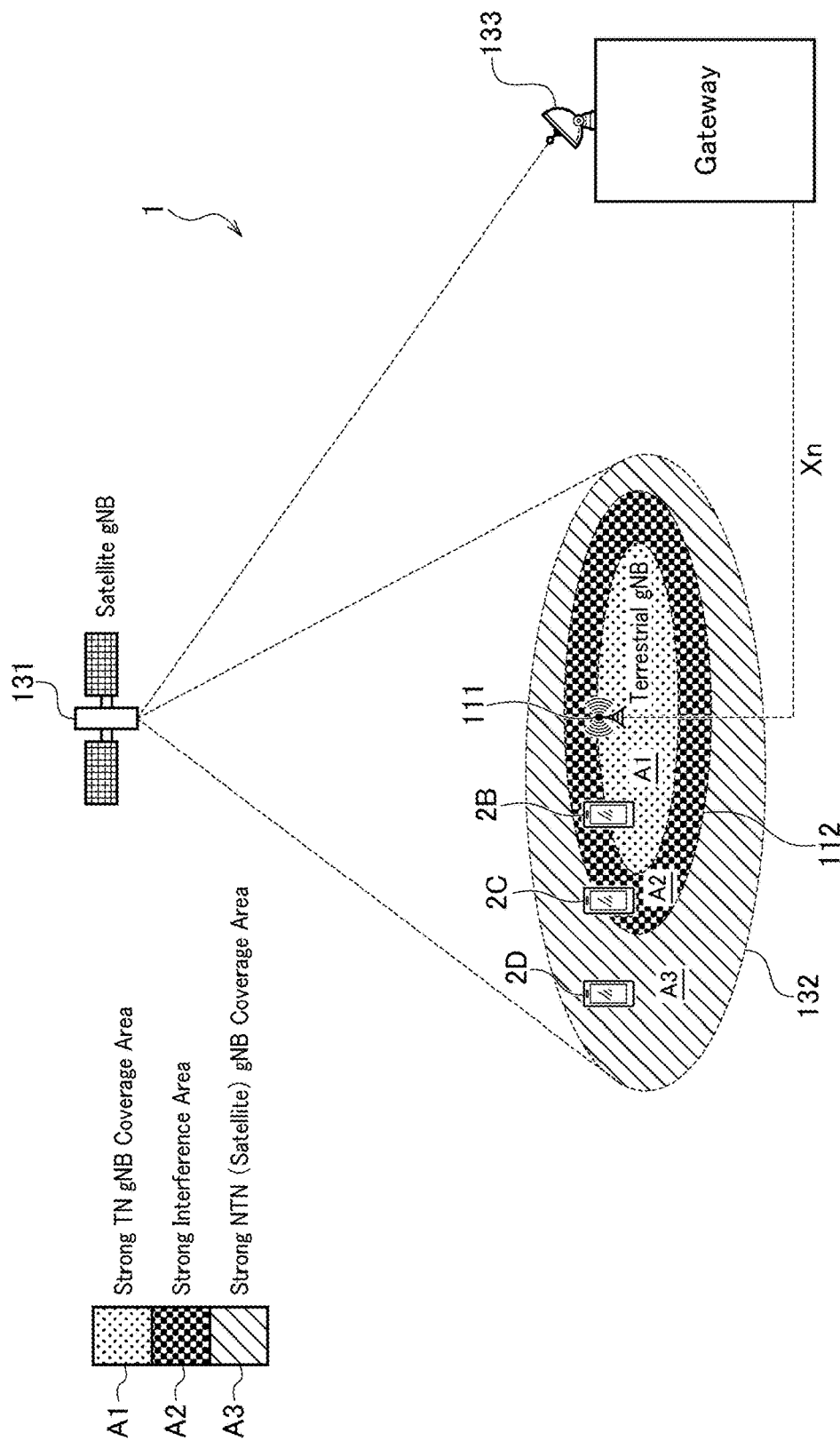
FIG. 2 schematically shows the wireless communication system with a communication satellite.

FIG. 2 shows a schematic of the same wireless communication system 1 as in FIG. 1, with the communication satellite 131 in focus. As mentioned above, communication satellite 131 can combine up to 2,800 beams to create one or more satellite communication cells 132 on the ground. Through the communication satellite 131 and the gateway 133, the communication devices 2 (2C, 2D and the like) in the satellite communication cell 132 perform 5G communication and/or 4G communication with communication devices 2 (2B, 2C and the like) in shown and/or not-shown TNs, and/or, perform communication with any other communication devices via 5GC and/or EPC as core network. The gateway 133 that connects the NTN and the TN for mutual communication is installed on the ground and is configured to communicate with both of the communications satellite 131 as a flying base station and a 5G base station 111 and/or 4G base station 121 (not shown) as a terrestrial base station.

The connection "Xn" between the gateway 133 and the 5G base station 111 in FIG. 2, may indicate that the gateway 133 is directly connected to the 5G base station 111, or that the gateway 133 is indirectly connected to the 5G base station 111 included in the other RAN (Radio Access Network) via a CN. In other words, the gateway 133 is configured to be able to communicate with any 5G base station 111 (and/or any 4G base station 121) in the 5G wireless communication system 11 (and/or 4G wireless communication system 12), directly without a CN or indirectly via a CN.

In the example in FIG. 2, only one of the one or more satellite communication cells 132 formed on the ground by the communication satellite 131 is shown, in which one 5G cell 112 is formed by one 5G base station 111. In the example, the entire 5G cell 112 is the overlapping area of the 5G cell 112 as a terrestrial communication cell and the satellite communication cell 132 as a flying communication cell. In the overlapping area, TN communication radio waves from the 5G base station 111 (shown in FIG. 2 as "Terrestrial gNB" or "TN gNB") and NTN communication radio waves from the communication satellite 131 (shown in FIG. 2 as "Satellite gNB" or "NTN gNB") coexist.

In the central area A1 (close to the 5G base station 111) of the 5G cell 112 as the overlapping area, the signal strength of the TN communication radio wave from the 5G base station 111 is significantly greater than the signal strength of NTN communication radio wave from the communication satellite 131, so the communication device 2B in the central area A1 can perform stable 5G communication with the 5G base station 111. On the other hand, in the peripheral area A2 (far from the 5G base station 111) of the 5G cell 112 as the overlapping area, there is no significant difference between the signal strength of the TN communication radio wave from the 5G base station 111 and the signal strength of NTN communication radio wave from the communication satellite 131, so the TN communication radio wave and the NTN communication radio wave interfere with each other. The interference is particularly strong if the TN communication radio wave and the NTN communication radio wave use overlapping or adjacent frequency bands, and the communication device 2C in the peripheral area A2 cannot perform stable 5G communication with either of the 5G base station 111 and the communication satellite 131. In the non-overlapping area A3 of the satellite communication cell 132 that does not overlap with the 5G cell 112, the signal strength of the NTN communication radio wave from the communication satellite 131 is significantly greater than the signal strength of the TN communication radio wave from the 5G base station 111, so the communication device 2D in the non-overlapping area A3 can perform stable 5G communication with the communication satellite 131.

Figure 3:
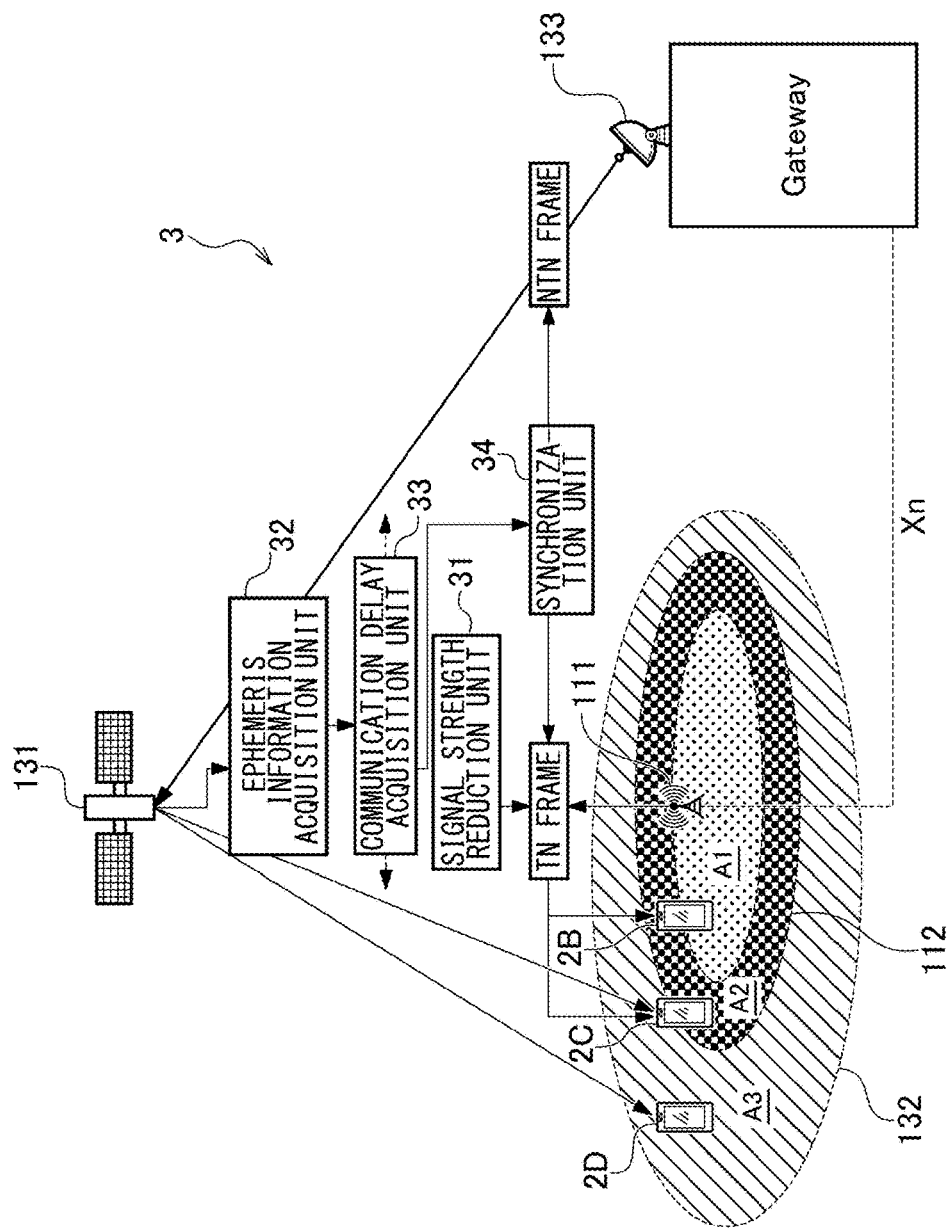
FIG. 3 is a functional block diagram showing the concept of the communication control apparatus.

As described above, in the wireless communication system 1 in which TN and NTN coexist, it is necessary to take measures to ensure stable communication of the communication device 2C within the peripheral are A2 or interference area A2 where both networks interfere with each other. FIG. 3 is a functional block diagram showing the concept of the communication control apparatus 3 that realizes stable communication within the interference area A2. The communication control apparatus 3 includes a signal strength reduction unit 31, an ephemeris information acquisition unit 32, a communication delay acquisition unit 33, and a synchronization unit 34. The functional blocks are realized by the cooperation of hardware resources, such as the central processing unit, memory, input devices, output devices, and peripheral devices connected to the computer, and software that is executed using them. Regardless of the type of computer or its installation location, each of the above functional blocks may be realized with the hardware resources of a single computer, or by combining hardware resources distributed across multiple computers. Especially in the embodiment, some or all of functional blocks of the communication control apparatus 3 may be realized in computer and/or processor provided in the communication devices 2 (2C and the like), the communication satellite 131, the gateway 133, terrestrial base stations 111 and 121 connected directly or indirectly to the gateway 133.

Figure 4:
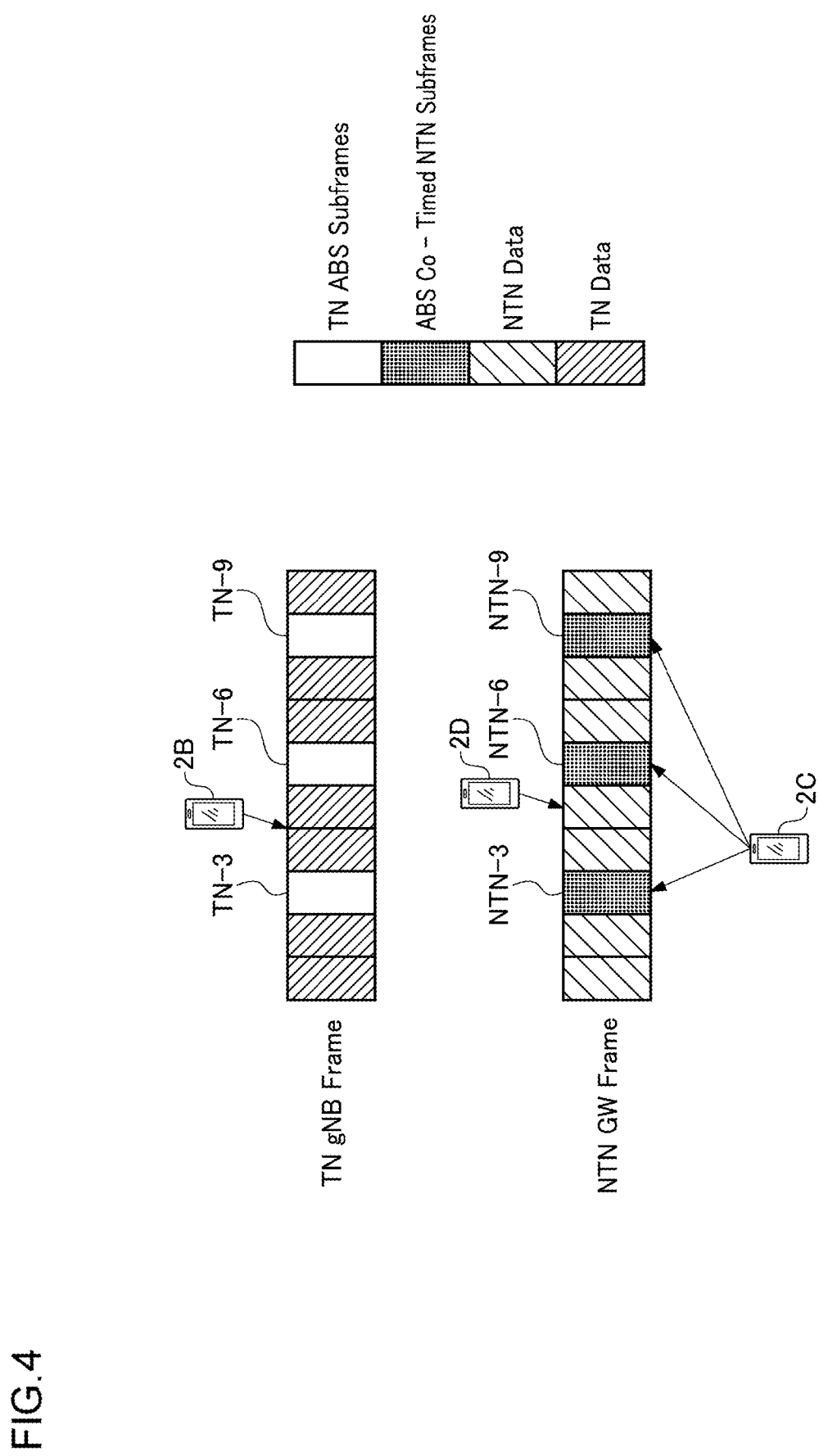
FIG. 4 is a schematic representation of a TN frame and an NTN frame.

The signal strength reduction unit 31 reduces the signal strength of portion of at least one of the TN data transmitted by the terrestrial base station 111 constituting the TN, and, the NTN data transmitted by the gateway 133 and/or the communication satellite 131 constituting the NTN, at least in the overlapping area or the interference area A2 of the terrestrial communication cell 112 and the satellite communication cell 132. FIG. 4 schematically shows the TN frame generated and transmitted by the 5G base station 111 and the NTN frame generated by the terrestrial base stations 111 and 121 connected to the gateway 133 and transmitted by the gateway 133. The TN frame (shown as "TN gNB Frame" in FIG. 4) is composed of time-continuous IN data or TN subframes, and the NTN frame (shown as "NTN GW Frame" in FIG. 4) is composed of time-continuous NTN data or NTN subframes.

In 5G, each 10 ms frame is composed of ten 1 ms subframes, each subframe is composed of one or more slots with variable length (1 ms, 0.5 ms, 0.25 ms and the like), and each slot is composed of 14 variable-length OFDM symbols. In the exemplary embodiment, the TN data or the NTN data as the processing unit of the signal strength reduction unit 31 corresponds to the 1 ms subframe. However, the signal strength reduction unit 31 may process the TN data or the NTN data in different processing unit such as frame (10 ms), slot, symbol and the like. If a different signal structure than that of 5G is adopted in a wireless communication standard other than 5G (6G and the like), the signal strength reduction unit 31 may process the TN data or the NTN data in any signal unit in time domain of such signal structure.

In the example in FIG. 4, the signal strength reduction unit 31 is used to reduce the signal strength of some TN subframes out of the 10 TN subframes included in the TN frame. Specifically, the signal strength of the third TN subframe TN-3 of each TN frame, the sixth TN subframe TN-6 of each TN frame, the ninth TN subframe TN-9 of each TN frame are reduced by the signal strength reduction unit 31. Thus, the signal strength reduction unit 31 reduces signal strength of the TN data according to a predetermined pattern that specifies a portion (third, sixth and ninth) of subframes included in a TN frame as a TN data group.

The signal strength reduction unit 31 may reduce the signal strength of the target TN subframes TN-3, 6, 9 to zero, in which case the transmission of TN signal or IN data by the target TN subframes TN-3, 6, 9 is prohibited. Specifically in 5G, in the target TN subframes TN-3, 6, 9 which are subject to processing by the signal strength reduction unit 31, no data transmission is performed not only in PDSCH (Physical Downlink Shared Channel) that transmits real data, but also in PDCCH (Physical Downlink Control Channel) that transmit its control data. On the other hand, it is preferable to transmit as usual the minimum control data related to communication control in the TN such as the CSI-RS (channel state information reference signal) and SSB (synchronization signal block) even in the target TN subframes TN-3, 6,9 which are subject to processing by the signal strength reduction unit 31. As mentioned above with respect to FIG. 2, the TN frames transmitted from the 5G base station 111 are used for communication with the communication device 2B in the central area A1. In the example in FIG. 4, there are no real data in the target TN subframes TN-3, 6,9 which are subject to processing by the signal strength reduction unit 31, so the communication device 2B uses seven TN subframes that are not subject to processing by the signal strength reduction unit 31 for communication with the 5G base station 111.

The above processes of the signal strength reduction unit 31 is sometimes referred to as ABS (Almost Blank Subframe). In the following embodiments, an example in which the signal strength reduction unit 31 performs ABS process for TN frames will be described, but the signal strength reduction unit 31 can also be used for the ABS process for NTN frames, in which case the signal strength reduction unit 31 reduces the signal strength of some NTN subframes out of the 10 NTN subframes included in the NTN frame.

In NTN frames not subject to ABS process, all 10 NTN subframes can be used for communication of real data (NTN data). As mentioned earlier with respect to FIG. 2, NTN frames transmitted from the gateway 133 and/or communication satellite 131 are used for communication with communication device 2D in the non-overlapping area A3. Further in the example in FIG. 4, NTN frames are also used to communicate with communication device 20 in the interference area A2. Specifically, out of the 10 NTN subframes, the 3 NTN subframes NTN-3, 6, 9 (shown as "ABS Co-Timed NTN Subframes" in FIG. 4), which are co-timed with the 3 TN subframes TN-3, 6, 9 (shown as "TN ABS Subframes" in FIG. 4) subject to ABS process by the signal strength reduction unit 31, are used for communication with communication device 20 in the interference area A2. And, the remaining 7 NTN subframes (shown as "NTN Data" in FIG. 4), which are co-timed with the 7 TN subframes (shown as "TN Data" in FIG. 4) not subject to ABS process by the signal strength reduction unit 31, are used for communication with communication device 2D in the non-overlapping area A3.

Although TN communication radio wave from the 5G base station 111 and NTN communication radio wave from the communication satellite 131 interfere with each other in the interference area A2, the signal strength of TN communication radio wave from the 5G base station 111 is reduced by the signal strength reduction unit 31 during the period subject to ABS process, the communication device 20 in the interference area A2 is able to normally receive the NTN communication radio wave from the communication satellite 131. Thus, the gateway 133 and/or the communication satellite 131 can communicate with the communication device 20 in the interference area A2 of the terrestrial communication cell 112 and the satellite communication cell 132, by means of the NTN data while the signal strength of the TN data is reduced by the signal strength reduction unit 31. On the other hand, the signal strength of the NTN communication radio wave from the communication satellite 131 is significantly greater than the signal strength of the TN communication radio wave from the 5G base station 111 in the non-overlapping area A3, so the communication device 2D in the non-overlapping area A3 is able to normally receive the NTN communication radio wave from the communication satellite 131 even outside of the period subject to ABS process. In such a manner, out of the 10 NTN subframes, the NTN subframes NTN-3, 6, 9 in the period subject to ABS process are preferentially allocated to the communication device 2C in the interference area A2, and the remaining NTN subframes are allocated to the communication device 2D in the non-overlapping area A3.

The ABS process in FIG. 4 is executed according to the ephemeris information of the communication satellite 131 obtained by the ephemeris information acquisition unit 32 described below. For example, the communication control apparatus 3 recognizes that there is an overlapping area (A1+A2) of the satellite communication cell 132 provided on the ground by the communication satellite 131 and the terrestrial communication cell 112 provided on the ground by the terrestrial base station 111, especially there is the interference area A2 where the interference is significant between NTN communication radio wave and TN communication radio wave as shown in FIG. 3, based on the ephemeris information of the communication satellite 131 obtained by the ephemeris information acquisition unit 32, and the ABS process by the signal strength reduction unit 31 is initiated. The fact that the ABS process is initiated by the signal strength reduction unit 31 provided on the TN side is notified to the NTN side through the terrestrial communication path "Xn" (described with respect to FIG. 2) between the terrestrial base station 111 and the gateway 133 (i.e. between TN and NTN). The ephemeris information of the communication satellite 131 acquired by the ephemeris information acquisition unit 32 is also shared with the 5G base station 111 (the signal strength reduction unit 31) that performs the ABS process. The signal strength reduction unit 31 that has received a command to initiate the ABS process shares the predetermined ABS pattern as shown in FIG. 4 (which designates the 3rd, 6th and 9th subframes TN-3, 6,9 of a TN frame as ABS) with the gateway 133 and/or other terrestrial base stations 111 and 121 connected to the gateway 133 through the terrestrial communication path "Xn".

Figure 5:
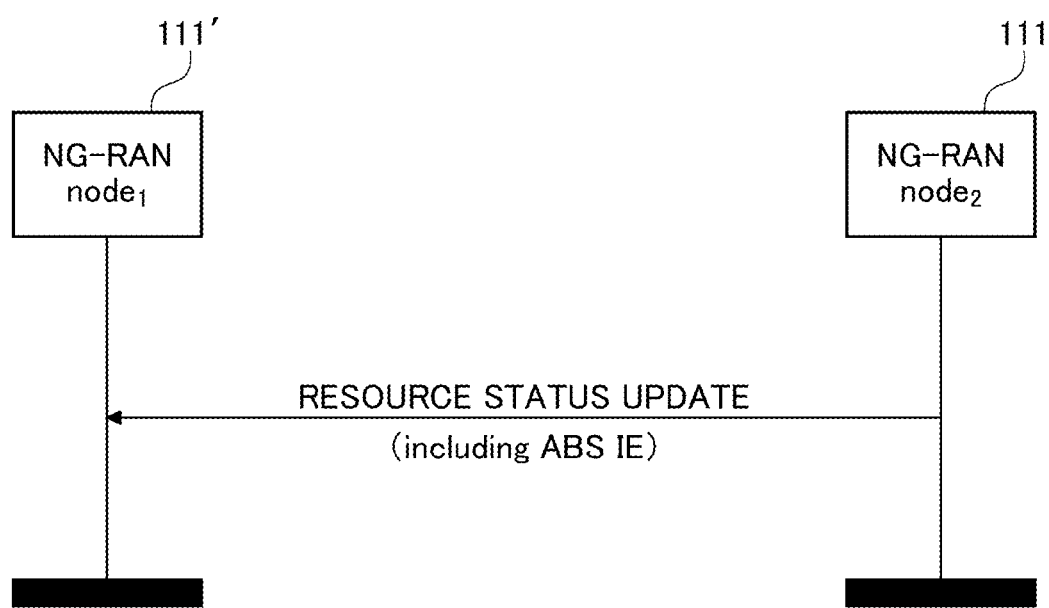
FIG. 5 shows an example of a 5G base station on the TN side transmitting ABS-related information to another 5G base station on the NTN side.

FIG. 5 shows an example where the 5G base station 111 "NG-RAN node$_2$," on the TN side where the signal strength reduction unit 31 is provided transmit "RESOURCE STATUS UPDATE" including ABS-related information (ABS IE) through the terrestrial communication path "Xn", to the other 5G base station 111' "NG-RAN node$_1$," on the NTN side connected to the gateway 133. FIG. 6 shows an example of ABS-related information shared between the TN side and the NTN side through the terrestrial communication path "Xn". The "ABS Pattern Info" indicates the ABS pattern. In the example shown in the figure, "ABS Pattern Info" is 40 bits of data, each bit corresponding to each of 40 consecutive TN subframes in time. In the example in FIG. 4, where a TN frame is composed of 10 TN subframes, each of 40 TN subframes included in the time-continuous four TN frames can be individually designated as ABS (TN subframe whose signal strength is reduced by the signal strength reduction unit 31). Specifically, a TN subframe with a bit of "1" is an ABS, and a IN subframe with a bit of "0" is a non-ABS (TN subframe in which normal TN data is transmitted). "ABS Inactive" indicates that ABS process is not performed. For example, "ABS Inactive" is enabled before the signal strength reduction unit 31 starts the ABS process, and "ABS Inactive" is disabled after the signal strength reduction unit 31 starts the ABS process.

In order to successfully perform the ABS process shown in FIG. 4, synchronization is necessary between the TN frames transmitted by the 5G base station 111 and the NTN frames transmitted by the gateway 133 and/or the communication satellites 131. Here, the NTN frames generated by the gateway 133 are transmitted to the communication devices 2C and 2D in the satellite communication cell 132 via the communication satellite 131, which involves large communication delay, transmission delay, propagation delay and the like. Therefore, in the communication control apparatus 3 according to the embodiment, the TN frames and the NTN frames are synchronized based on the recognized communication delay of the NTN frames, by means of the ephemeris information acquisition unit 32, the communication delay acquisition unit 33, the synchronization unit 34 and the like described below.

The ephemeris information acquisition unit 32 acquires ephemeris information or position information of the communication satellite 131 as a flying base station. The communication delay acquisition unit 33 acquires or calculates the communication delay of the NTN frames with which the gateway 133 communicates with the satellite communication cell 132 via the communication satellite 131, based on the ephemeris information of the communication satellite 131 acquired by the ephemeris information acquisition unit 32, the position information of the gateway 133 from which the NTN frames are transmitted, the position information of the satellite communication cell 132 to which the NTN frames are transmitted and/or the position information of the communication device 2 in such satellite communication cell 132. Here, the communication satellites 131 and the gateways 133 that constitute the NTNs can be generally classified into two types: transparent (retransmitting) type and regenerative type.

The transparent type gateway 133 implements only the relay function to retransmit the signal received from the RAN or the CN to the communication satellite 131, and the transparent type communication satellite 131 implements only the relay function to retransmit the signal received from the gateway 133 to the satellite communication cell 132 (the same is true for the opposite communication path). Therefore, the transparent type communication satellites 131 and gateway 133 are not suitable for providing information processing functions such as the ephemeris information acquisition unit 32 and the communication delay acquisition unit 33. Thus, if information processing functions are to be provided on the transmission side of the NTN frames, it is preferable to provide the ephemeris information acquisition unit 32 and/or the communication delay acquisition unit 33 in the terrestrial base stations 111 and 121 connected to the gateway 133 111 and 121. If information processing functions are to be provided on the receiving side of the NTN frames, it is preferable to provide the ephemeris information acquisition unit 32 and/or the communication delay acquisition unit 33 in the communication devices 2C and 2D in the satellite communication cell 132.

On the other hand, since information processing functions can be provided in the regenerative type communication satellite 131 and gateway 133, the ephemeris information acquisition unit 32 and the communication delay acquisition unit 33 may be provided there. If the communication satellite 131 is the regenerative type, since the NTN frames are substantially generated by the communication satellite 131 which is downlink-communicated to the satellite communication cell 132. Therefore, the NTN communication delay to be considered in the synchronization of the TN frames and the NTN frames is the communication delay only between the communication satellite 131 and the satellite communication cell 132 (the communication delay between the gateway 133 and the communication satellite 131 does not have to be considered). In such a case, the communication delay acquisition unit 33 acquires the communication delay between the communication satellite 131 and the satellite communication cell 132.

Figure 7:
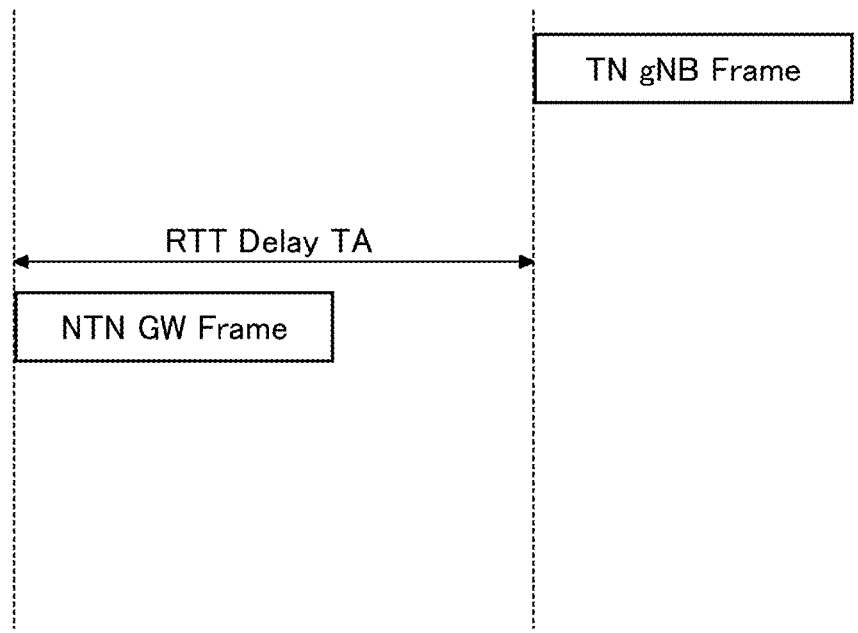
FIG. 7 Shows the NTN frame sent from the gateway earlier in time and the TN frame sent from 5G base station later in time.

The synchronization unit 34 synchronizes the TN frames or the TN data transmitted by the 5G base station 111 and the NTN frames or the NTN data transmitted by the gateway 133 and/or the communication satellite 131, based on the NTN communication delay acquired by the communication delay acquisition unit 33. Although specific examples are described below, in case the synchronization unit 34 is provided on the NTN side (the communication satellite 131, the gateway 133, the terrestrial base stations 111 and 121 connected to the gateway 133 and the like), the synchronization unit 34 causes the gateway 133 and/or the communication satellite 131 to transmit the NTN frames earlier than the TN frames transmitted by the 5G base station 111 by the communication delay calculated by the communication delay acquisition unit 33. And, in case the synchronization unit 34 is provided on the TN side (the terrestrial base stations 111 and 121, the communication devices 2 and the like), the synchronization unit 34 causes the start of transmission of the TN frames to be delayed by the communication delay acquired by the communication delay acquisition unit 33, after the gateway 133 and/or the communication satellite 131 starts transmission of the NTN frames. As shown schematically in FIG. 7, in any case, roundtrip time (RTT) delay TA corresponding to the communication delay obtained by the communication delay acquisition unit 33 is set between the NTN frame "NTN GW Frame" transmitted from the gateway 133 earlier in time and the TN frame "TN gNB Frame" transmitted from the 5G base station 111 later in time.

As described above, each of the functional blocks 31-34 of the communication control apparatus 3 could be distributed among the NTN side (the communication satellite 131, the gateway 133, the terrestrial base stations 111 and 121 connected to the gateway 133 and the like) and the TN side (the terrestrial base stations 111 and 121, the communication devices 2 and the like). In such a case, through the terrestrial communication path "Xn" between the gateway 133 and the terrestrial base stations 111 and 121 (i.e. between NTN and TN) as described with respect to FIG. 2, necessary information is shared among each functional block 31-34 in a timely manner, so that the cooperative operation of the various portions of the communication control apparatus 3 is realized. Note that since the ephemeris information acquisition unit 32 and the communication delay acquisition unit 33 are responsible for highly related processes, it is preferable that they be provided together on either side of the NTN side or TN side.

Next, multiple examples of communication control by the communication control apparatus 3 will be shown in detail.

Figure 8:
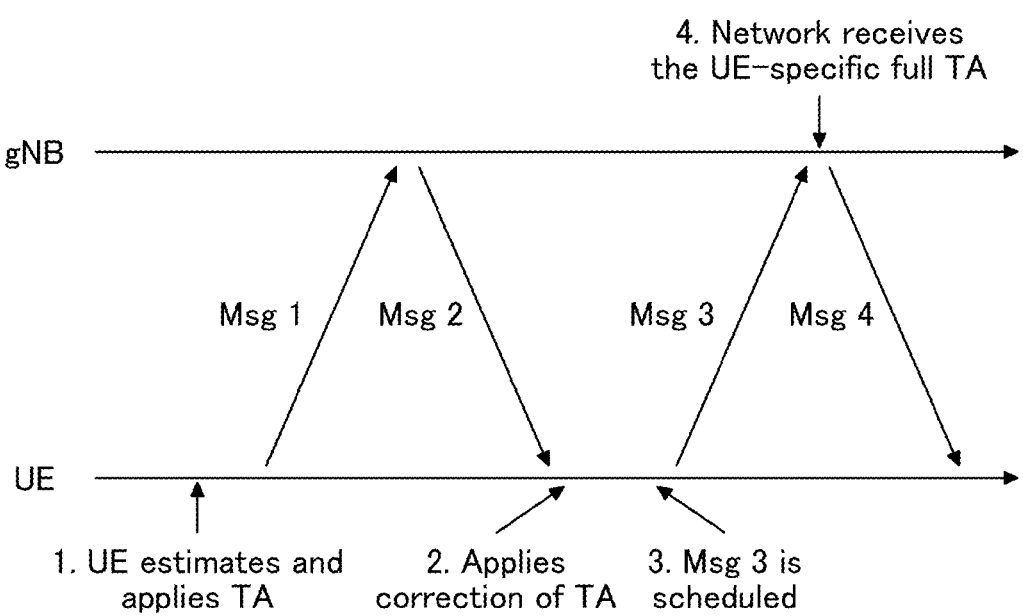
FIG. 8 shows a first example of a communication control apparatus.
Figure 9:
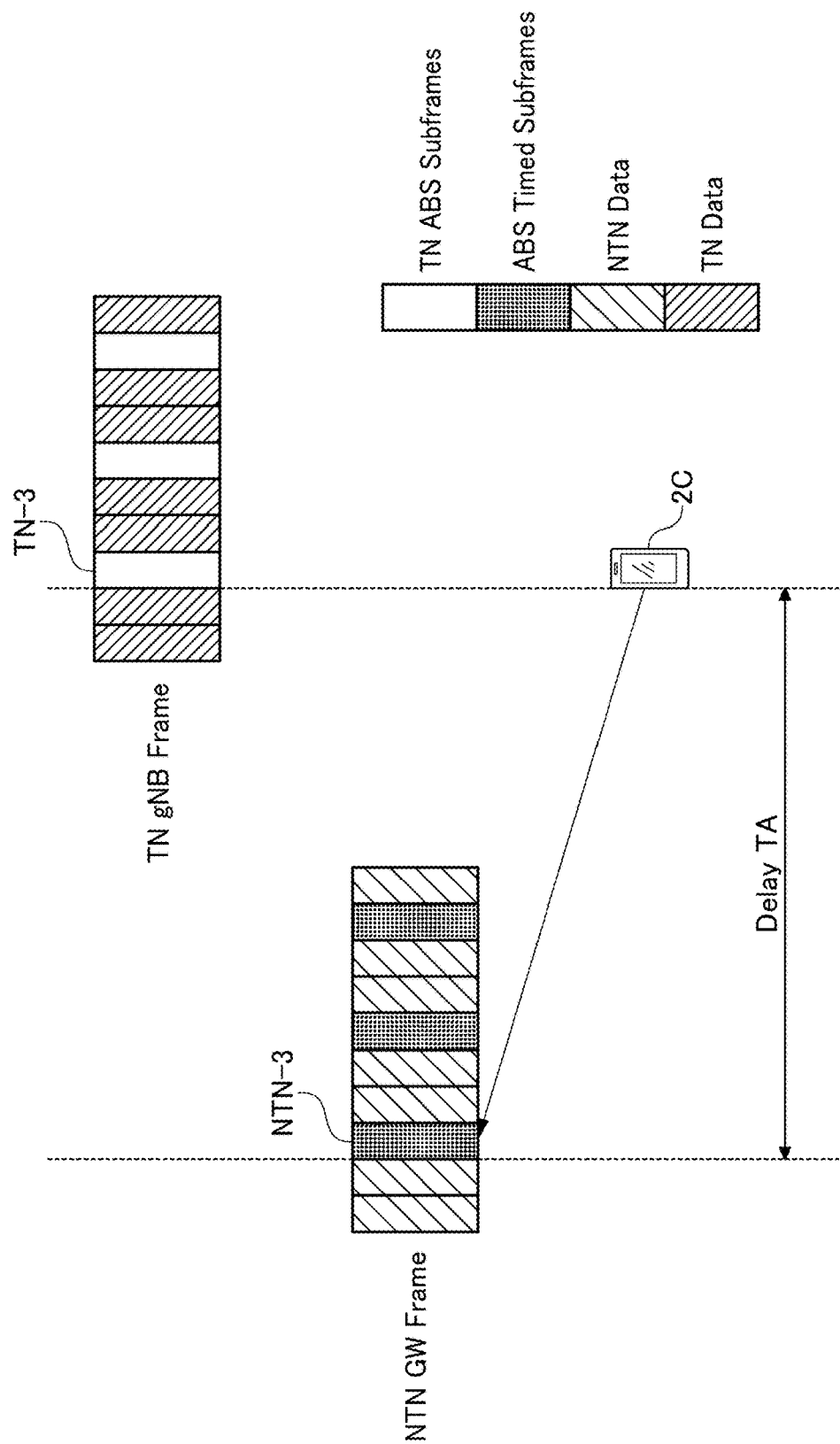
FIG. 9 shows a first example of a communication control apparatus.

In the first example of the communication control apparatus 3 shown in FIGS. 8 and 9, the communication device 2C in the interference area A2 includes a positioning sensor based on a satellite positioning system and the like such as GPS and GNSS that can measure its own position information. In such a case, the ephemeris information acquisition unit 32 and the communication delay acquisition unit 33 are realized by the communication device 2C. The communication device 2C functioning as the communication delay acquisition unit 33 calculates the communication delay between itself (the communication device 2C) and the communication satellite 131, based on its own position information measured by its own positioning sensor and the ephemeris information of the communication satellite 131 acquired by the ephemeris information acquisition unit 32. Note that the communication device 2C may acquire the position information of the gateway 133 via the terrestrial communication path "Xn" and the 5G base station 111. Based on the position information along with the ephemeris information of the communication satellite 131 acquired by the ephemeris information acquisition unit 32, the communication device 2C may calculate the communication delay between the gateway 133 and the communication satellite 131. The communication delay between the gateway 133 and the communication satellite 131 may be calculated by the 5G base station 111, the communications satellite 131, the gateway 133, the terrestrial base stations 111 and 121 connected to the gateway 133 and the like.

As shown in FIG. 8, the communication device 2C "UE" functioning as the communication delay acquisition unit 33 can acquire the accurate communication delay between the communication device 2C and the gateway 133 via the communication satellite 131, by exchanging messages (Msg 1-4) according to the known RACH process or RACH procedure with the terrestrial base station "gNB" on the NTN side connected to the gateway 133. In the figure, the communication delay is denoted as "TA" (Timing Advance). In the first step, when the communication device 2C sends the first message "Msg 1", it estimates the communication delay "TA" based on its own position information measured by its own positioning sensor and the ephemeris information of the communication satellite 131 acquired by the ephemeris information acquisition unit 32. The estimated communication delay "TA" is applied to the first message "Msg 1". In the second step, the communication device 2C that has received the second message "Msg 2" from the terrestrial base station "gNB" applies the correction of the communication delay "TA" based on the second message "Msg 2". In the third step, the communication device 20 schedules the third message "Msg 3". In the fourth step, the communication delay "TA" specific to the communication device 2C is obtained at the NTN side where the terrestrial base station "gNB" is provided.

FIG. 9 schematically shows the synchronization process of the synchronization unit 34 based on the NTN's communication delay TA obtained by the communication delay acquisition unit 33 through the RACH process in FIG. 8. The synchronization unit 34 causes the gateway 133 to transmit the NTN frame "NTN GW Frame" earlier than the TN frame "TN gNB Frame" transmitted by the 5G base station 111 by the communication delay TA acquired by the communication delay acquisition unit 33. As a result, the TN frames and the NTN frames received by the communication device 2C in interference area A2 synchronize with each other. Therefore, as described above with respect to FIG. 4, while the communication device 2C receives its allocated NTN subframes (NTN-3 and the like) during the period subject to ABS process, the corresponding TN subframes (TN-3 and the like) are ABS, thereby the communication device 2C is able to normally receive its allocated NTN subframes.

Figure 10:
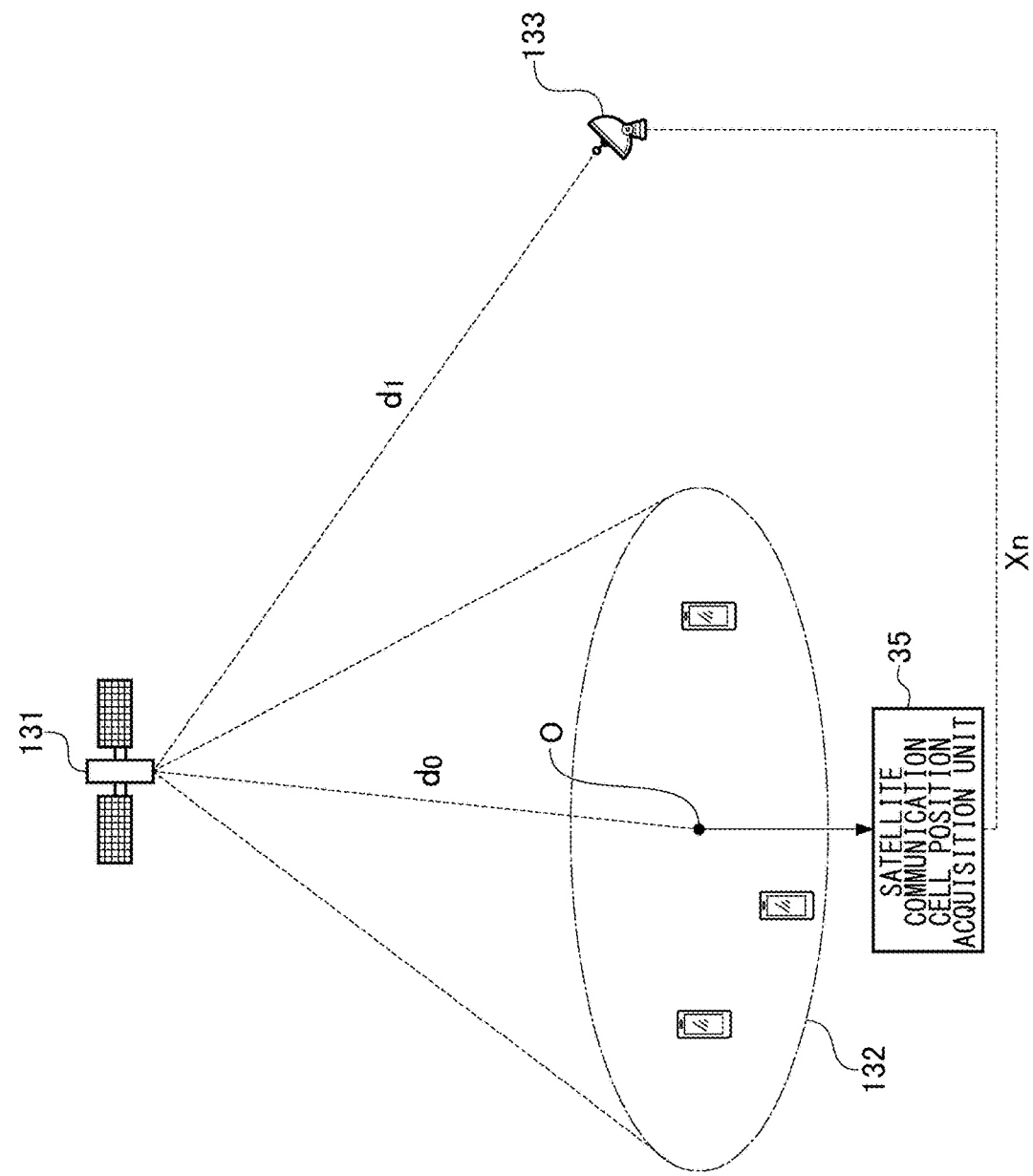
FIG. 10 shows a second example of a communication control apparatus.
Figure 11:
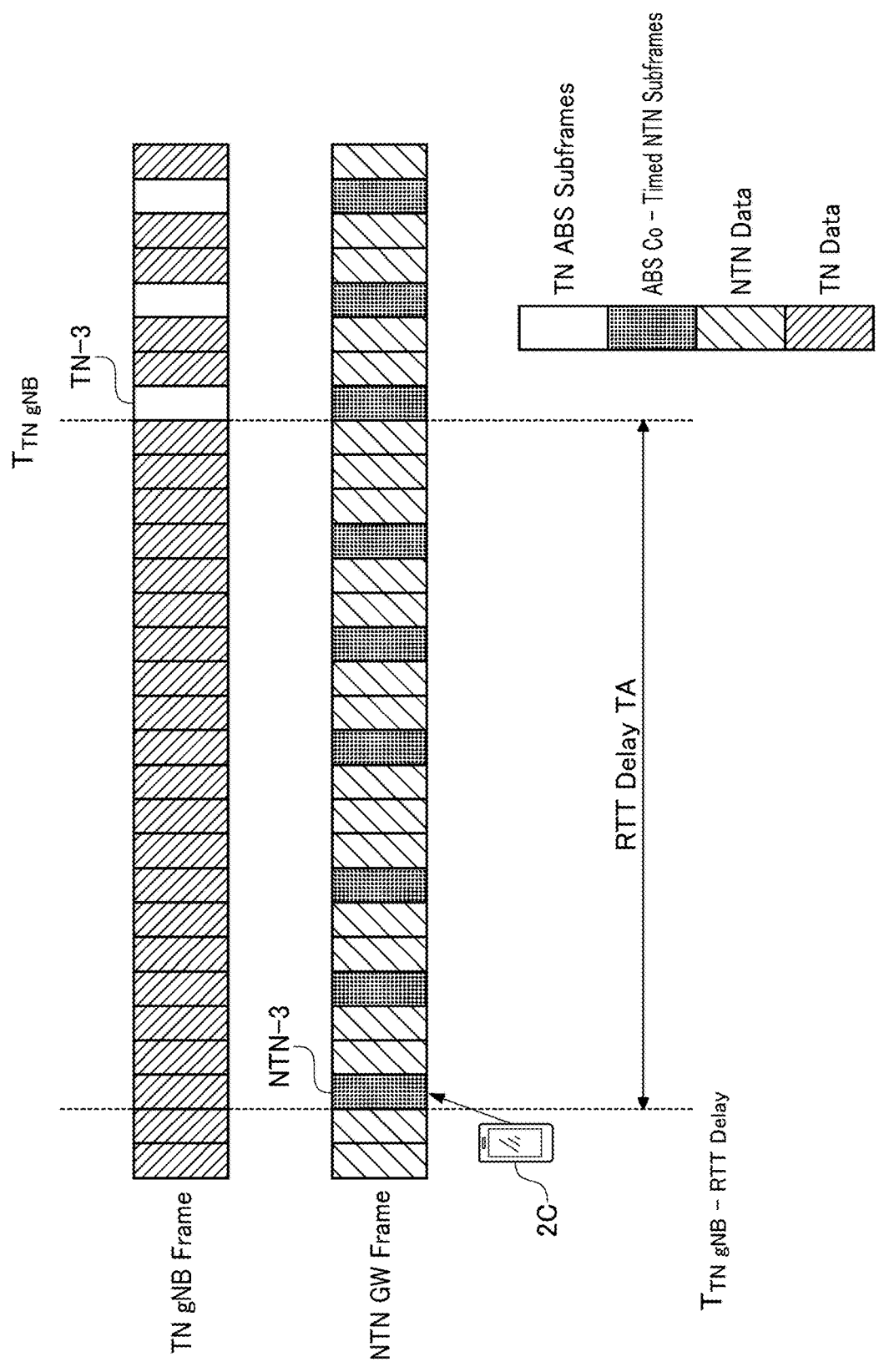
FIG. 11 shows a second example of a communication control apparatus.

The second example of the communication control apparatus 3 shown in FIGS. 10 and 11 is suitable when the communication device 2 in the satellite communication cell 132 is not equipped with a positioning sensor. In the first example where the communication device 2 is equipped with a positioning sensor, all or portion of the ephemeris information acquisition unit 32 and the communication delay acquisition unit 33 were realized in the communication device 2. However, in the second example where the communication device 2 is not equipped with a positioning sensor, all or portion of the ephemeris information acquisition unit 32 and the communication delay acquisition unit 33 are realized on the NTN side, specifically in the terrestrial base station 111 and 121 connected to the gateway 133. Besides, in the first example where the communication device 2 is equipped with a positioning sensor, the position information of the communication device 2 was used in calculating the communication delay of the NTN. However, in the second example where the communication device 2 is not equipped with a positioning sensor, the representative position information of the satellite communication cell 132 acquired by the satellite communication cell position acquisition unit 35 as a flying communication cell position acquisition unit is used in calculating the communication delay of the NTN. The representative position information of the satellite communication cell 132 is typically the position information of the center O of the satellite communication cell 132 as shown in FIG. 10. The satellite communication cell position acquisition unit 35 can calculate the representative position information of the satellite communication cell 132 based on the ephemeris information of the communication satellite 131 obtained by the ephemeris information acquisition unit 32 (not shown) and/or terrain information or height difference information of the ground.

The communication delay acquisition unit 33 (not shown) provided on the NTN side can calculate the communication delay between the communication satellite 131 and the satellite communication cell 132, based on the representative position information of the satellite communication cell 132 acquired by the satellite communication cell position acquisition unit 35 and the ephemeris information of the communication satellite 131 acquired by the ephemeris information acquisition unit 32. The communication delay is over the distance do between the communication satellite 131 and the center O of the satellite communication cell 132 in FIG. 10. In addition, the communication delay acquisition unit 33 provided on the NIN side can calculate the communication delay between the gateway 133 and the communication satellite 131, based on the known position information of the gateway 133 and the ephemeris information of the communication satellite 131 acquired by the ephemeris information acquisition unit 32. The communication delay is over the distance $d_1$ between the gateway 133 and the communication satellite 131 in FIG. 10. In such a manner, the communication delay acquisition unit 33 provided on the NTN side can calculate the communication delay of the NTN over the total distance $d_0+d_1$ between the satellite communication cell 132 (the center O) and the gateway 133. As mentioned above, for the communication delay acquisition unit 33 in the case where the communication satellite 131 is regenerative type, it is sufficient to obtain the communication delay of the NTN over the distance do between (the center O of) the satellite communication cell 132 and the communication satellite 131.

FIG. 11 schematically shows the synchronization process of the synchronization unit 34 based on the NTN's communication delay TA obtained by the communication delay acquisition unit 33 through the process in FIG. 10. The synchronization unit 34 causes the start of transmission of the TN frame "TN gNB Frame" corresponding to the ABS process to be delayed by the communication delay TA "RTT Delay" acquired by the communication delay acquisition unit 33, after the gateway 133 starts transmission of the NTN frame "NTN GW Frame" corresponding to the ABS process. For example, if the transmission start time of the first TN subframe TN-3 during the period subject to the ABS process is "$T_{TN\_gNB}$", the transmission start time of the first NTN subframe NTN-3 during the period subject to the ABS process is expressed as "$T_{TN\_gNB}$-RTT Delay". As a result, the TN frames and the NIN frames received by the communication device 2C in interference area A2 synchronize with each other, and the ABS process starts at the same time for the TN frames and the NTN frames. Therefore, it can be effectively prevented that the communication device 2C in the interference area A2 receives an NTN frame for which the ABS process has started while it receives a TN frame for which the ABS process has not yet started. Similarly, it can be effectively prevented that the communication device 2C in the interference area A2 receives a TN frame for which the ABS process has started while it receives an NTN frame for which the ABS process has not yet started.

Figure 12:
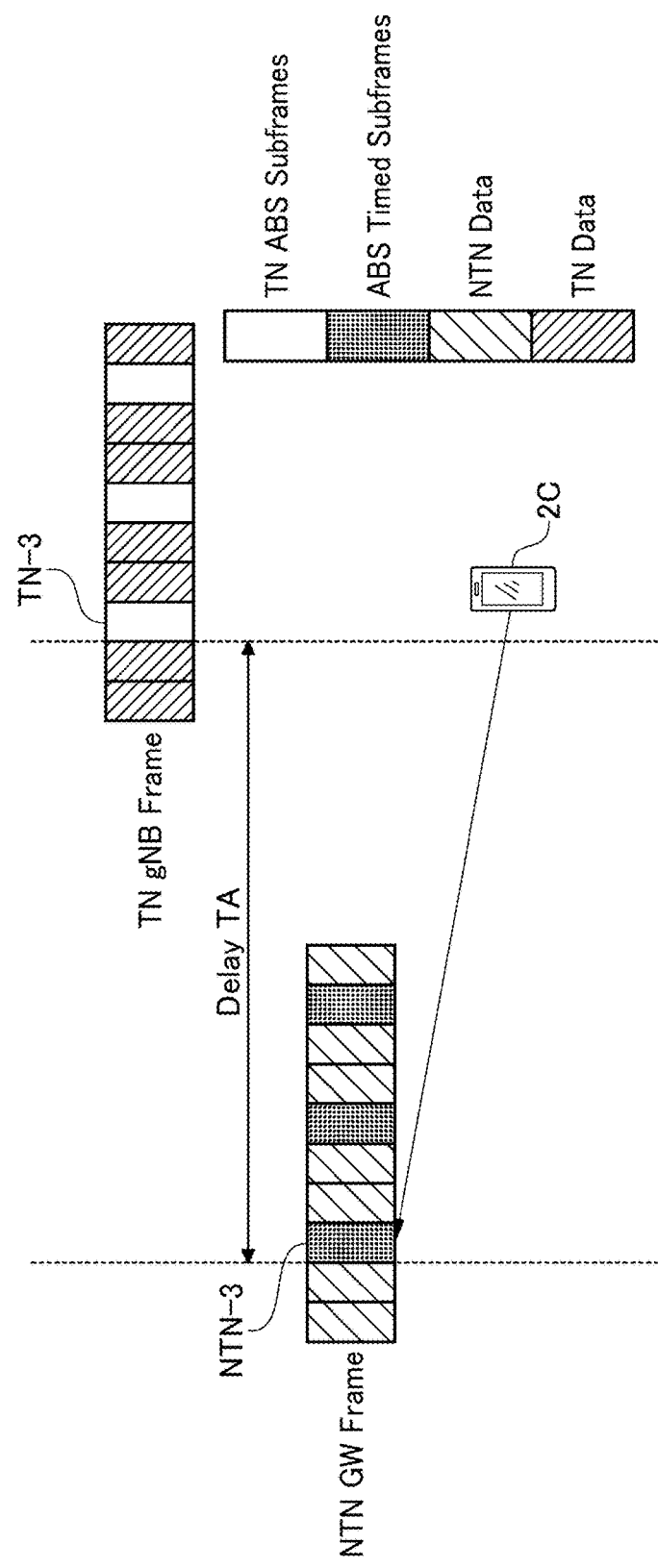
FIG. 12 shows a third example of a communication control apparatus.

The third example of the communication control apparatus 3 shown in FIG. 12 is also suitable when the communication device 2 in the satellite communication cell 132 is not equipped with a positioning sensor. FIG. 12 schematically shows the synchronization process of the synchronization unit 34 based on the NTN's communication delay TA obtained by the communication delay acquisition unit 33 through the similar process to FIG. 10. The synchronization unit 34 causes the gateway 133 to transmit the NTN frame "NTN GW Frame" earlier than the TN frame "TN gNB Frame" transmitted by the 5G base station 111 by the communication delay TA acquired by the communication delay acquisition unit 33. As a result, the TN frames and the NIN frames received by the communication device 20 in the interference area A2 synchronize with each other. Therefore, as described above with respect to FIG. 4, while the communication device 2C receives its allocated NTN subframes (NTN-3 and the like) during the period subject to ABS process, the corresponding TN subframes (TN-3 and the like) are ABS, thereby the communication device 2C is able to normally receive its allocated NIN subframes.

Generally, a communication device 2 constantly measures the signal strength and the like of the serving cell with which it is communicating, and the neighboring cells adjacent to the serving cell. In addition, a communication device 2 also constantly measures the channel state information (CSI) of the channel in communication. In case where such a communication device 2 is in the interference area A2 as shown in FIG. 3, it needs to consider the ABS pattern as shown in FIG. 4 when it performs measurement of the satellite communication cell 132 as a serving cell or neighboring cell and/or measurement of the CSI.

Specifically, the communication device 2C in FIG. 3 performs measurement of the satellite communication cell 132 as a serving cell for the RLM (Radio Link Monitoring) and/or the RRM (Radio Resource Management) during the period subject to the ABS process (the 3rd, 6th and 9th subframe periods in the example in FIG. 4) when there is no or little interference from the 5G cell 112. If the communication device 2C were to perform measurement of the satellite communication cell 132 as a serving cell outside the period subject to the ABS process, the RLF (Radio Link Failure) would be caused by the interference from the 5G cell 112.

Similarly, the communication device 2C in FIG. 3 performs measurement of the satellite communication cell 132 as a neighboring cell for the RRM during the period subject to the ABS process when there is no or little interference from the 5G cell 112. In such a case, the communication device 2C is not in communication with the satellite communication cell 132, but it acquires the ABS pattern as shown in FIGS. 4 and 6 via the 5G base station 111 and the like of the 5G cell 112 and the like as a serving cell, and performs measurement of the satellite communication cell 132 as a neighboring cell. For example, NTN base station 111 and/or 121 connected to the gateway 133 transmits the parameters and/or configuration information of the SMTC (SSB based Measurement Timing Configuration) window based on the ABS pattern of the satellite communication cell 132 to the communication device 2C through the terrestrial communication path "Xn" and the like, thereby the communication device 2C can accurately measure the NTN subframes of the satellite communication cell 132 during the period subject to the ABS process.

When the communication device 2C in the interference area A2 performs CSI measurements, it is preferable to separately perform the first CSI measurement over the ABS period without the interference between the satellite communication cell 132 and the 5G cell 112, and the second CSI measurement over the non-ABS period with the interference between the satellite communication cell 132 and the 5G cell 112. This is because the channel state differs significantly between the ABS period and the non-ABS period depending on the presence or absence of the interference, and if the measurement is made without distinguishing the periods, a worse CSI on average would be obtained. With the two types of CSI measurement data, the channel state of each of the satellite communication cell 132 and the 5G cell 112, and the effect of the interference in the both cells on the channel state can be understood, the communication device 2C can perform communication more efficiently according to the channel state.

The present disclosure has been described above based on embodiments. It is understood by those skilled in the art that the embodiments are exemplary and that various variations are possible in the combination of each component and/or each process thereof, and that such variations are also within the scope of the present disclosure.

The functional configuration of each device described in the embodiment can be realized by hardware resources or software resources, or by the cooperation of hardware resources and software resources. As hardware resources, processors, ROM, RAM, and other LSIs can be used. Operating systems, applications, and other programs can be used as software resources.

The present disclosure relates to communication control technology in communication system.

What is claimed is:

1. A communication control apparatus that controls a terrestrial network comprising a terrestrial base station installed on the ground and capable of communicating with a communication device in a terrestrial communication cell provided by the terrestrial base station on the ground by means of time-continuous TN data, and, a non-terrestrial network comprising a flying base station and capable of communicating with a communication device in a flying communication cell provided by the flying base station on the ground by means of time-continuous NTN data, comprising:
   a signal strength reduction unit that reduces signal strength of at least portion of at least one of the TN data and the NTN data at least in an overlapping area of the terrestrial communication cell and the flying communication cell;

a communication delay acquisition unit that acquires communication delay between the flying base station and the flying communication cell; and a synchronization unit that synchronizes the TN data and the NTN data based on the communication delay acquired by the communication delay acquisition unit.

2. The communication control apparatus according to claim 1, wherein the signal strength reduction unit prohibits transmission of signal by a portion of at least one of the TN data and the NTN data at least in the overlapping area of the terrestrial communication cell and the flying communication cell.

3. The communication control apparatus according to claim 1, wherein the signal strength reduction unit reduces signal strength of at least portion of the TN data at least in the overlapping area of the terrestrial communication cell and the flying communication cell.

4. The communication control apparatus according to claim 3, wherein the flying base station communicates with communication device in the overlapping area of the terrestrial communication cell and the flying communication cell by means of the NTN data while the signal strength reduction unit reduces signal strength of the TN data.

5. The communication control apparatus according to claim 1, wherein the signal strength reduction unit reduces signal strength of the data according to a predetermined pattern that specifies a portion of data included in a data group.

6. The communication control apparatus according to claim 1, further comprising an ephemeris information acquisition unit that acquires ephemeris information of the flying base station, wherein the communication delay acquisition unit is provided in a communication device comprising a positioning sensor that can measure its own position information, and calculates the communication delay between the flying base station and the communication device in the flying communication cell, based on the position information of the communication device measured by the positioning sensor and the ephemeris information of the flying base station acquired by the ephemeris information acquisition unit, and the synchronization unit causes the flying base station to transmit the NTN data earlier than the TN data transmitted by the terrestrial base station by the communication delay calculated by the communication delay acquisition unit.

7. The communication control apparatus according to claim 1, further comprising an ephemeris information acquisition unit that acquires ephemeris information of the flying base station, and a flying communication cell position acquisition unit that acquires representative position information of the flying communication cell, wherein the communication delay acquisition unit calculates the communication delay between the flying base station and the flying communication cell, based on the representative position information of the flying communication cell acquired by the flying communication cell position acquisition unit and the ephemeris information of the flying base station acquired by the ephemeris information acquisition unit, and the synchronization unit causes the flying base station to transmit the NTN data earlier than the TN data transmitted by the terrestrial base station by the communication delay calculated by the communication delay acquisition unit.

8. The communication control apparatus according to claim 1, wherein the synchronization unit is provided in the terrestrial base station, and causes terrestrial base station to delay the start of transmission of the TN data by the communication delay acquired by the communication delay acquisition unit, after the flying base station starts transmission of the NTN data.

9. The communication control apparatus according to claim 1, wherein a gateway capable of communicating with both the flying base station and the terrestrial base station is installed on the ground, and the communication delay acquisition unit acquires the delay of the gateway's communication with the flying communication cell via the flying base station.

10. The communication control apparatus according to claim 9, wherein the communication delay acquisition unit is provided in the terrestrial base station connected to the gateway.

11. The communication control apparatus according to claim 10, further comprising an ephemeris information acquisition unit that acquires ephemeris information of the flying base station, wherein the communication delay acquisition unit calculates the communication delay between the gateway and the flying base station, based on the ephemeris information of the flying base station acquired by the ephemeris information acquisition unit.

12. A communication control method that controls a terrestrial network comprising a terrestrial base station installed on the ground and capable of communicating with a communication device in a terrestrial communication cell provided by the terrestrial base station on the ground by means of time-continuous TN data, and, a non-terrestrial network comprising a flying base station and capable of communicating with a communication device in a flying communication cell provided by the flying base station on the ground by means of time-continuous NTN data, comprising:

reducing signal strength of at least portion of at least one of the TN data and the NTN data at least in an overlapping area of the terrestrial communication cell and the flying communication cell;

acquiring communication delay between the flying base station and the flying communication cell; and synchronizing the TN data and the NTN data based on the acquired communication delay.

13. A non-transitory computer-readable medium storing a communication control program that controls a terrestrial network comprising a terrestrial base station installed on the ground and capable of communicating with a communication device in a terrestrial communication cell provided by the terrestrial base station on the ground by means of time-continuous TN data, and, a non-terrestrial network comprising a flying base station and capable of communicating with a communication device in a flying communication cell provided by the flying base station on the ground by means of time-continuous NTN data, causing a computer to perform:

reducing signal strength of at least portion of at least one of the TN data and the NTN data at least in an overlapping area of the terrestrial communication cell and the flying communication cell;

acquiring communication delay between the flying base station and the flying communication cell; and synchronizing the TN data and the NTN data based on the acquired communication delay.

\* \* \* \* \*